United States Patent

Kressdorf et al.

Patent Number: 5,102,976
Date of Patent: Apr. 7, 1992

[54] WATER-SOLUBLE POLYMERIZABLE POLYESTERS

[75] Inventors: Burkhard Kressdorf, Walsrode; Erhard Luhmann, Bomlitz; Lutz Hoppe, Walsrode, all of Fed. Rep. of Germany

[73] Assignee: Wolff Walsrode AG, Walsrode, Fed. Rep. of Germany

[21] Appl. No.: 677,046

[22] Filed: Mar. 29, 1991

[30] Foreign Application Priority Data

Apr. 7, 1990 [DE] Fed. Rep. of Germany ....... 4011353

[51] Int. Cl.$^5$ ............................................. C08G 63/20
[52] U.S. Cl. ................................. 528/272; 528/297; 528/300; 528/301; 528/306
[58] Field of Search ............... 528/272, 297, 300, 301, 528/306

[56] References Cited

U.S. PATENT DOCUMENTS

| 4,035,320 | 7/1977 | Lawson | 525/32.1 |
| 4,195,102 | 3/1980 | Turpin | 427/27 |
| 4,281,068 | 7/1981 | Frank et al. | 521/62 |
| 4,673,758 | 6/1987 | Meixner et al. | 560/90 |
| 4,897,458 | 1/1990 | Seelmann-Eggebert et al. | 526/318.3 |
| 4,933,428 | 6/1990 | Piepho et al. | 528/272 |

FOREIGN PATENT DOCUMENTS 3241264 10/1984 Fed. Rep. of Germany .
A340589 8/1989 Fed. Rep. of Germany .

Primary Examiner—Maurice J. Welsh
Assistant Examiner—Sam A. Acquah
Attorney, Agent, or Firm—Sprung Horn Kramer & Woods

[57] ABSTRACT

Improved $\alpha,\beta$-unsaturated polyesters for paint applications are based on an unsaturated polycarboxylic acid, a polyalkylene glycol having an average molecular weight of 300 to 1,000 and an alkoxylated triol containing no unsaturated groups.

9 Claims, No Drawings

WATER-SOLUBLE POLYMERIZABLE POLYESTERS

This invention relates to new water-soluble, polymerizable α,β-unsaturated polyesters for paint applications.

In view of more stringent pollution control requirements, increasing interest is being shown in paint systems containing little, if any, organic solvent. Systems such as these can be adjusted to the necessary processing viscosity by addition of water or copolymerizable reactive diluents. The so-called reactive diluents are low molecular weight, physiologically unsafe polymerizable substances. They can cause serious irritation or sensitization of the skin. In addition, they often have strong odors. The percentage content of reactive diluents in the paint system, which varies according to the required viscosity, influences the properties of the paint, in some cases considerably. Such disadvantages can be avoided by the use of water as diluent.

Water-dilutable, polymerizable paint binders are known per se. However, they are generally not soluble, but only emulsifiable, in water. Hitherto, these dispersions have mostly been oil-in-water dispersions (DE-A-3 441 154, EP-A-0 290 684, DE-A-3 340 589). Dispersions such as these are very difficult to produce in dissolvers using emulsifiers or very high shear forces, in addition to which their storage life is limited. Dispersions of the type in question also cannot be adjusted to their application viscosity as readily as genuine solutions. In the painting of wood, poorer wetting of pores is generally obtained with dispersions than with paints that are genuine solutions. The industrially important roller application technique is much more difficult to apply with dispersions than with genuine solutions.

Thus, the radiation-curing binders described in DE-A-3 241 264, which are prepared by co-condensation of dicarboxylic acids and acrylic acid with polyethylene glycol and with alkoxylated trihydric to hexahydric alcohols, can only be emulsified, but not dissolved, in water. The use of acrylic acid for the synthesis of these polyesters leads to products which can cause physiological problems, such as irritation of the skin and mucous membrane. Accordingly, these products have to be classified as irritating materials and, accordingly, can only be processed with elaborate safety precautions.

DE-A-340 589 describes similar polyesters which are relatively sensitive to water through their fairly high polyalkylene glycol content. In addition, the use of acrylic acid makes them physiologically unsafe.

EP-A-0 320 734 describes unsaturated, water-soluble polyesters which are suitable for radiation curing. These polyesters contain polyalkylene glycols having a high degree of alkylation which adversely affect the film properties. Thus, the feel, hardness and resistance to water of the cured binders are unsatisfactory. In addition, acrylic acid is used in the production of these polyesters.

DE-A-3 441 154 describes unsaturated, preferably linear polyesters which contain no acrylic acid units. However, these polyesters can only be emulsified, but not dissolved, in water and, accordingly, are attended by the above-described disadvantages of emulsions in relation to water-soluble products.

Accordingly, the problem addressed by the present invention was to provide a water-soluble, polymerizable paint binder based on polyesters which would not contain any acrylic acid units and which, after curing, would have favorable paint properties, more particularly improved flow, fault-free surfaces and adhesion by comparison with known water-soluble polyesters.

The present invention relates to water-soluble, polymerizable, α,β-unsaturated polyesters based on a polyalkylene glycol A, an α,β-unsaturated polycarboxylic acid D or an anhydride thereof and at least one allyl-ether-functional alcohol E, characterized in that the polyalkylene glycol A has a molecular weight of 300 to 1,000 and in that the polyester contains co-condensed units of at least one alkoxylated triol B, which does not have any unsaturated groups, and optionally co-condensed units of a tetrahydric to hexahydric polyol C.

Preferred polyalkylene glycols A are polyethylene glycols, polyethylene glycols having a molecular weight of 400 to 600 being particularly preferred.

Alkoxylated, trihydric or tetrahydric to hexahydric triols B and optionally polyols C are understood to be alkoxylated and/or propoxylated trihydric or tetrahydric to hexahydric aliphatic alcohols. Preferred alkoxylated triols B contain 3 to 20 mol ethylene or propylene oxide per mol triol. The triols B preferably have a molecular weight of 250 to 600. The triols B are preferably based on trihydric aliphatic alcohols, for example glycerol, trimethylol propane, trimethylol ethane, preferably trimethylol propane and glycerol and, more preferably, glycerol. Preferred alkoxylated polyols C contain more than three hydroxyl groups and 1 to 20 mol ethylene or propylene oxide units per mol polyol and preferably 1 to 5 mol ethylene or propylene oxide units per mol polyol. The polyols C are preferably based on saturated, aliphatic, tetrahydric to hexahydric alcohols, for example pentaerythritol, dipentaerythritol, erythritol, sorbitol, di-trimethylol propane, preferably pentaerythritol.

The polycarboxylic acids D or anhydrides are preferably unsaturated dicarboxylic acids, anhydrides of dicarboxylic acids being particularly preferred. Suitable dicarboxylic acids for the production of the polyesters according to the invention are maleic acid, chloromaleic acid, fumaric acid or anhyrides of these dicarboxylic acids where they can be produced, preferably maleic acid and, more preferably, maleic anhydride.

In addition to at least one esterifiable hydroxyl group, the allyl-ether-functional alcohols E contain at least one and preferably two or more allyl ether units.

Suitable alcohols are, for example, allyl, methallyl, ethallyl, chloroallyl ethers of various alcohols, including for example glycerol mono- or diallyl ether, trimethylol ethane mono- or dimethallyl ether, trimethylol propane mono- or diallyl ether, ethoxylated or propoxylated allyl-, methallyl, ethallyl or chloroallyl alcohols, hexane-1,3,5-triol mono- or dichloroallyl ether, pentaerythritol mono-, di- or triallyl ether, but-2,3-ene-1,5-diol mono- or dihydroxyethyl ether, 2,2,6,6-tetramethylol cyclohexanol tetrallyl ether, but-2,3-ene-1,4-diol monoallyl ether, mixed ethers, such as trimethylol propane monoallyl/monocrotyl ether and pentaerythritol mono- or diallyl/monobenzyl ether, trimethylol propane mono- and diallyl ethers being particularly preferred. In one preferred embodiment, components A to E are used in the following quantities:

| | |
|---|---|
| Polyalkylene glycol A: | 10 to 40 parts by weight, |
| preferably: | 15 to 30 parts by weight |
| Alkoxylated polyol B: | 15 to 45 parts by weight, |
| preferably: | 17 to 36 parts by weight |
| Alkoxylated polyol C: | 0 to 10 parts by weight, |

| -continued | |
|---|---|
| preferably: | 0.1 to 5 parts by weight |
| Polycarboxylic acid D: | 10 to 40 parts by weight. |
| preferably: | 15 to 30 parts by weight |
| Allyl-ether-functional alcohol E. | 15 to 40 parts by weight. |
| preferably: | 20 to 35 parts by weight |

The polyesters may be produced by known methods, for example by melt or azeotropic esterification of the alcohols and acids or esterifiable derivatives thereof, for example anhydrides (cf. "Methoden der organischen Chemie", Houben-Weyl, 4th Edition, Vol. 14-2, Georg-Thieme-Verlag, Stuttgart, 1961). They are preferably produced by melt condensation in an inert gas atmosphere at temperatures of 140° to 200° C. and preferably at temperatures of 150 to 190° C.

To protect the polyesters against unwanted premature crosslinking, polymerization inhibitors or antioxidants may be added to them during their preparation. Suitable stabilizers are described in "Methoden der organischen Chemie", Houben-Weyl, 4th Edition, Vol. 14-1, Georg-ThiemeVerlag, Stuttgart, 1961. The stabilizers in question are the compounds normally used to prevent thermal polymerization, for example phenols and phenol derivatives, preferably sterically hindered phenols, amines, nitrosamines, quinones, hydroquinone monoalkyl ethers, phenothiazines or phosphoric acid esters. They are generally used in quantities of 0.001 to 3% by weight and preferably in quantities of 0.005 to 0.5% by weight. Toluhydroquinone in a concentration of 0.01 to 0.05% by weight is particularly suitable. Esterification catalysts may be used to accelerate the reaction. Suitable esterification catalysts are organic and inorganic acids, for example p-toluene sulfonic acid, hydrochloric acid or concentrated sulfuric acid. p-Toluene sulfonic acid is preferred. Other suitable esterification catalysts are bases and even metal salts, for example antimony, tin, titanium and lead compounds (cf. Houben-Weyl, Vol. E 20, Georg-Thieme-Verlag, Stuttgart, 1987).

The reaction is carried out to an acid value of the polyester of 1 to 50 and preferably to 10 to 30 mg KOH/g polyester.

Obtaining the desired product properties requires, in particular, a reduction in the secondary reactions which always occur to a considerable extent in conventional processes, including polymerization of the allyl groups, by shortening the reaction times.

Surprisingly, the paint binders according to the invention are readily soluble in water and also show good paint properties. The binders according to the invention form genuine or colloidal solutions in water. Colloidal solutions are understood to be solutions in which the particle size is so small that samples having a layer thickness of 1 mm show a transmission of more than 95% at a wavelength of 750 nm. Such clear solubility as this cannot be achieved in Comparison Example 1.

In addition, the paint binder is soluble in the usual organic solvents and reactive diluents.

The paint binders according to the invention may contain the components required to obtain special technical effects, such as fillers, pigments, dyes, thixotropic agents, smoothing agents, flatting agents, flow control agents, etc., in the usual quantities. The paint properties may be varied according to requirements by addition of reactive diluents or other high molecular weight paint binders. They may be combined with other typical constituents of paints, such as for example nitrocellulose, polyacrylate resins, alkyd resins, unsaturated polyesters and other radiation-curing components.

Suitable methods of application include spray coating, roll coating, knife coating, casting, spread coating and dip coating. The binder according to the invention may be polymerized after evaporation of the water, paint films having favorable surface properties being obtained, preferably on wood, but also on plastics and metals. The polymerization may be carried out thermally and/or with addition of polymerization initiators (for example radical formers), and also by high-energy radiation (UV radiation, electron beams, X rays or gamma rays), in which case photo-initiators may be added. UV curing is particularly preferred.

Suitable photoinitiators are the known compounds for radiation curing, including for example aromatic keto compounds, benzophenones, alkyl benzophenones, halomethylated benzophenones, Michler's ketone, anthrone and halogenated benzophenones. Other suitable photoinitiators are 2,4,6-trimethyl benzoyl diphenyl phosphine oxide, phenyl glyoxylic acid ester, anthraquinone and its many derivatives, particularly benzoin and its derivatives, also benzyl ketals and hydroxyalkylphenones. Hydroxyalkylphenones and benzophenone are particularly preferred.

Curing may also be carried out with polymerization-initiating radical formers. Water-soluble peroxides or aqueous emulsions of water-insoluble peroxides are preferably used. The radical formers may be combined in known manner with accelerators, such as for example heavy metal salts of carboxylic acids, chelates and also acetates, naphthenates or acetyl acetonates of these metals. Providing they are soluble in water, the accelerators may also be added in the form of aqueous solutions, otherwise they are added in the form of aqueous emulsions.

EXAMPLES

Production of the Polyesters

The starting components listed in the following Table were subjected to melt condensation under nitrogen at 150° to 180° C. until the acid value indicated had been reached. In all the Examples, the condensation was carried out in the presence of 0.05% by weight toluhydroquinone.

Testing of the Paint Binder

After addition of 3% by weight of a mixture of 2-hydroxy-2-methyl-1-phenyl propanone and benzophenone (2:1) to a 90% by weight aqueous solution of the reaction products according to Examples 1 to 6, the samples are knife-coated onto a glass plate in a layer thickness of 90 μm, dried and irradiated with UV light (80 W/cm). The König pendulum hardness (DIN 5157) is then determined.

A sheet of wood is coated in the same way in a layer thickness of 30 μm, dried and irradiated with UV light. In this case, both flow and penetration of the paint into the substrate were evaluated.

The clear, viscous products, which are all readily soluble in water, form transparent, elastic and highly scratch-resistant films. In every case, very good flow is obtained, the paint shows negligible penetration into the wood and crater-free surfaces are obtained after UV curing.

COMPARISON EXAMPLE

The Comparison Example is carried out in accordance with Example 4 of DE-A 3 441 154. The product obtained cannot be dissolved, but only emulsified, in water, as the transmission measurement shows. In addition, the paint shows considerable penetration into the wood. Accordingly, this product is not suitable as a coating material. After UV curing, faults, (craters) can be seen in the paint film.

| Example | 1 | 2 | 3 | 4 | 5 | 6 | 7 | Comparison Example |
|---|---|---|---|---|---|---|---|---|
| Polyethylene glycol 400 | 16.9 | 29.3 | 17.5 |  | 24.2 | 16.7 | 22.8 |  |
| Polyethylene glycol 600 |  |  |  | 23.1 |  |  |  |  |
| Polyethylene glycol 1000 |  |  |  |  |  |  |  | 12.5 |
| Propylene glycol |  |  |  |  |  |  |  | 12.5 |
| Tetraethoxylated glycerol | 35.8 | 17.6 | 35.0 | 30.4 | 21.2 | 30.3 | 26.0 |  |
| Pentaethoxylated pentaerythritol |  |  |  |  |  | 2.9 |  |  |
| Benzyl alcohol |  |  |  |  |  |  |  | 12.9 |
| Maleic anhydride | 24.7 | 22.3 | 25.8 | 23.5 | 22.9 | 25.5 | 24.7 | 38.3 |
| Trimethylol diallyl ether | 24.5 | 30.8 | 21.7 | 22.5 | 31.7 | 24.5 | 23.7 | 29.2 |
| Trimethylol monoallyl ether |  |  |  |  |  |  | 2.8 |  |
| Acid value (mg KOH/g) | 28 | 22 | 27 | 23 | 23 | 22 | 24 | 18 |
| Transmission (%) | >95 | >95 | >95 | >95 | >95 | >95 | >95 | 0.3 |
| Pendulum hardness, DIN 53157, 90 μm on glass (S) | 57 | 42 | 62 | 50 | 70 | 75 | 43 | 55 |
| Flow | Very good | Very good | Very good | Very good | Very good | Very good | Very good | Satisfactory |
| Behavior on wood | Crater-free paint film, minimal penetration into the substrate | | | | | | | Small craters, serious penetration into the wood substrate |

We claim:

1. Water-soluble, polymerizable, α,β-unsaturated polyesters based on a polyalkylene glycol A, an α,β-unsaturated polycarboxylic acid D or an anhydride thereof and at least one allyl-ether-functional alcohol E, characterized in that the polyalkylene glycol A has a molecular weight of 300 to 1,000 and in that the polyester contains co-condensed units of at least one alkoxylated triol B, which does not have any unsaturated groups, and optionally co-condensed units of a tetrahydric to hexahydric polyol C.

2. Polyesters as claimed in claim 1, characterized in that the polyalkylene glycol A is a polyethylene glycol having a molecular weight of 400 to 600.

3. Polyesters as claimed in claim 1 characterized in that the triol B is alkoxylated with ethylene or propylene oxide.

4. Polyesters as claimed in claim 1 characterized in that the alkoxylated triol B has a molecular weight of 250 to 600.

5. Polyesters as claimed in claim 1 characterized in that the triol B is based on trimethylol propane or glycerol.

6. Polyesters as claimed in claim 1 characterized in that the Polycarboxylic acid D is maleic acid, chloromaleic acid or fumaric acid.

7. Polyesters as claimed in claim 1 characterized in that the allyl-ether-functional alcohol E is trimethylol diallyl ether and/or trimethylol monoallyl ether.

8. Polyesters as claimed in claim 1 characterized in that it is based on

| polyalkylene glycol A: | 10 to 40 parts by weight, |
|---|---|
| alkoxylated triol B: | 15 to 45 parts by weight, |
| tetrahydric to hexahydric polyol C: | 0 to 10 parts by weight, |
| polycarboxylic acid D: | 10 to 40 parts by weight, |
| allyl-ether-functional alcohol E: | 15 to 40 parrts by weight | method of coating a surface comprising applying to said surface the polyester of claim 1.

9. The method of coating a surface comprising applying to said surface the polyester of claim 1.

* * * * *